United States Patent
Ward et al.

(10) Patent No.: US 12,276,340 B2
(45) Date of Patent: Apr. 15, 2025

(54) SYSTEM AND METHOD FOR HIGH FLOW VALVE

(71) Applicant: Aventics Corporation, Lexington, KY (US)

(72) Inventors: James R. Ward, Lexington, KY (US); Kenneth Salyer, Lexington, KY (US)

(73) Assignee: Aventics Corporation, Lexington, KY (US)

( * ) Notice: Subject to any disclaimer, the term of this patent is extended or adjusted under 35 U.S.C. 154(b) by 0 days.

(21) Appl. No.: 17/723,069

(22) Filed: Apr. 18, 2022

(65) Prior Publication Data
US 2022/0235869 A1 Jul. 28, 2022

Related U.S. Application Data

(62) Division of application No. 16/630,152, filed as application No. PCT/US2018/041711 on Jul. 11, 2018, now Pat. No. 11,326,702.

(60) Provisional application No. 62/530,924, filed on Jul. 11, 2017.

(51) Int. Cl.
*F16K 11/07* (2006.01)
*F16K 41/10* (2006.01)

(52) U.S. Cl.
CPC .............. *F16K 11/07* (2013.01); *F16K 41/10* (2013.01)

(58) Field of Classification Search
CPC ........ F16K 11/07; F16K 41/01; F16K 11/044; F16K 31/0693
See application file for complete search history.

(56) References Cited

U.S. PATENT DOCUMENTS

| | | | | |
|---|---|---|---|---|
| 2,408,156 A | * | 9/1946 | Titus | B67D 7/16 222/457 |
| 2,826,215 A | * | 3/1958 | Wolfslau | F16K 31/0693 251/282 |
| 2,875,784 A | | 3/1959 | Cole | |
| 2,984,726 A | * | 5/1961 | Roeser | H01H 13/14 74/18.1 |
| 3,985,333 A | | 10/1976 | Paulsen | |
| 4,641,686 A | | 2/1987 | Thompson | |
| 4,880,033 A | | 11/1989 | Neff | |

(Continued)

FOREIGN PATENT DOCUMENTS

| | | |
|---|---|---|
| EP | 2385283 A1 | 11/2011 |
| WO | 2006/020964 A2 | 2/2006 |

OTHER PUBLICATIONS

International Search Report corresponding to International Patent Application No. PCT/US2018/041711, mailed Sep. 19, 2018 (2 pages).

(Continued)

*Primary Examiner* — Michael R Reid
(74) *Attorney, Agent, or Firm* — Quarles & Brady LLP

(57) ABSTRACT

A system and method for a high flow valve includes a seal rod, an armature configured to be connected to and move the seal rod, a valve seal configured to be connected to the seal rod, an exhaust seal seat and a diaphragm. The valve seal is configured to be positioned on the exhaust seal seat and exert an exhaust seal pressure force. The diaphragm is configured to exert a diaphragm force opposite the exhaust seat pressure force to balance the exhaust seal pressure force.

22 Claims, 4 Drawing Sheets

(56) References Cited

U.S. PATENT DOCUMENTS

| | | | | |
|---|---|---|---|---|
| 5,617,897 | A | * | 4/1997 | Myers .................. F16K 15/144 |
| | | | | 137/859 |
| 6,116,276 | A | | 9/2000 | Grill |
| 6,481,689 | B2 | * | 11/2002 | Grill .................. F15B 13/0405 |
| | | | | 251/129.17 |
| 6,488,050 | B1 | | 12/2002 | Jabcon |
| 8,567,303 | B2 | * | 10/2013 | Ingersoll ............. F04B 43/0054 |
| | | | | 92/99 |
| 9,010,373 | B2 | | 4/2015 | Neff et al. |
| 2002/0000255 | A1 | | 1/2002 | Grill |
| 2012/0061600 | A1 | | 3/2012 | Neff et al. |
| 2012/0216882 | A1 | | 8/2012 | Fishwick et al. |

OTHER PUBLICATIONS

Supplementary International Search Report corresponding to International Patent Application No. PCT/US2018/041711, mailed Oct. 17, 2019 (11 pages).

* cited by examiner

SYSTEM AND METHOD FOR HIGH FLOW VALVE

CROSS-REFERENCE TO RELATED APPLICATIONS

This application is a Divisional Patent Application of U.S. patent application Ser. No. 16/630,152, filed on Jan. 10, 2020, which represents the U.S. National Stage entry of International Application No. PCT/US2018/041711, filed on Jul. 11, 2018, which claims priority to U.S. Provisional Application Ser. No. 62/530,924 entitled "SYSTEM AND METHOD FOR HIGH FLOW VALVE" by Ward et al., filed Jul. 11, 2017, the disclosures of which are hereby incorporated herein by reference in their entireties.

TECHNICAL FIELD

The present invention relates to systems and methods for a high flow valve.

BACKGROUND

Many cartridge valves use a solenoid magnetic force to initiate a shift in valve position. Currently, high flow cartridge valves typically require a large solenoid magnetic force to initiate a shift in valve position. Such large solenoid magnetic forces use extensive power and can result in large and heavy valve assemblies. Further, an adjustable pole piece is often used to set an air gap in cartridge valves so that the initial solenoid magnetic force can initiate a shift in valve position.

Therefore, a significant obstacle with high flow valves is the use of extensive power and large, heavy, expensive valve assemblies. Accordingly, it will be appreciated that a high flow valve that uses less power and is smaller, lighter and less expensive is desired.

BRIEF DESCRIPTION OF THE DRAWINGS

Features and advantages of the various embodiments, and the manner of attaining them, will become more apparent and will be better understood by reference to the accompanying drawings.

DETAILED DESCRIPTION

Figure 1:
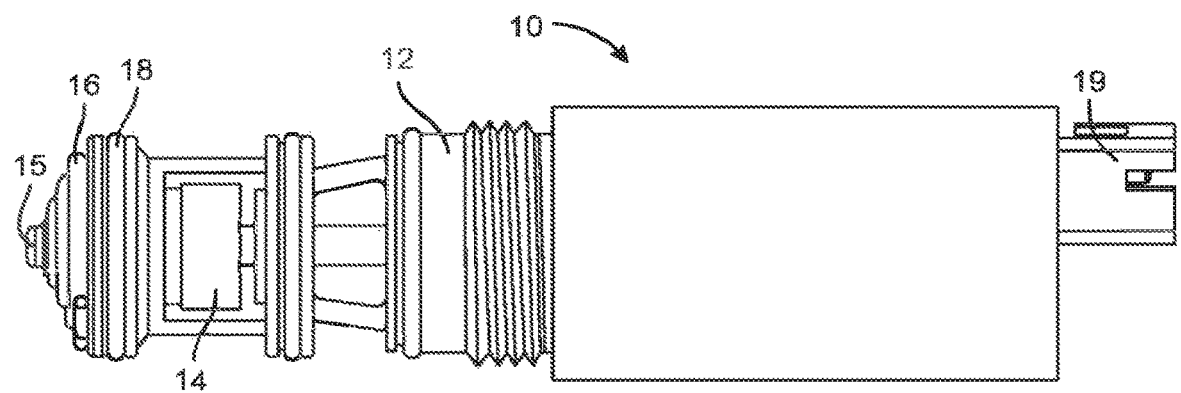
FIG. 1 is a side elevation view of a high flow valve according to an embodiment of a high flow valve in accordance with the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Turning now to the drawings, and more particularly to FIG. 1, an example embodiment of a high flow valve 10 in accordance with the present disclosure is illustrated. Returning to FIG. 1, the high flow valve 10 includes a body 12 and a valve seal 14. The high flow valve 10 also includes a seal rod 15 on which the valve seal 14 is fixedly positioned, a return spring 16 connected to the seal rod 15 and an O-ring 18 connected to the body 12.

The valve in this embodiment is a high flow 3/2 cartridge valve having three ports and a two position spool that directs air, gas, or liquid in and out of the three ports. Referring to FIG. 1, the three ports includes an inlet supply port "P" 32 where pressurized air or other gas enters the valve, a delivery port "A" 34 where the air is directed to the working part of the system (e.g. 02 concentrator sieve bed), and an exhaust port "R" 36 where the air from the working part of the system is exhausted to atmosphere.

Figure 2:
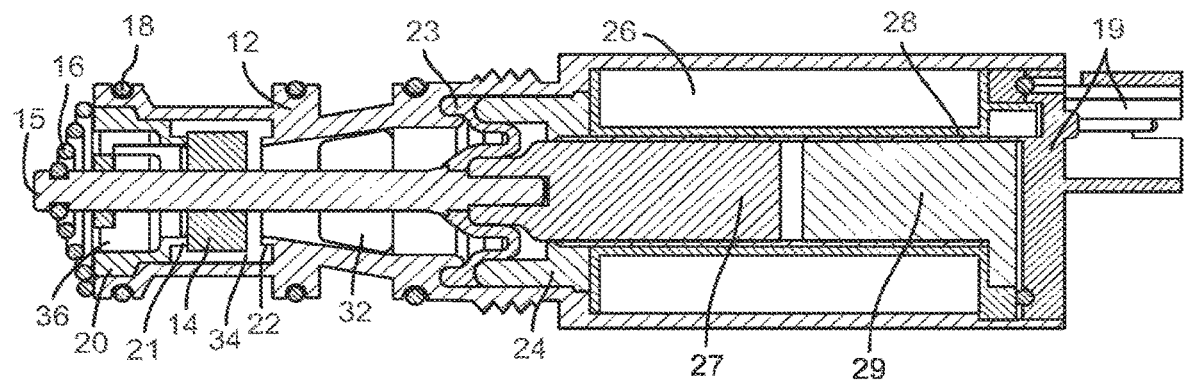
FIG. 2 is a cross-section view of the high flow valve illustrated in FIG. 1 with the valve in a de-energized state.

As depicted in FIG. 2, the high flow valve 10 includes an armature 27 connected to the seal rodd 15. The high flow valve 10 may further include a solenoid coil 26 and bobbin that may be energized and generate an electromagnetic field to move the armature 27. In some embodiments, the high flow valve 10 may further include a connector cap 19. The connector cap 19 may cover a connection to an electrical power source to provide AC or DC power to energize the solenoid coil 26 and bobbin. The high flow valve 10 may also include an armature guide tube 28 to assist with guiding the armature 27 and a pole piece 29 to attract the armature 27.

Figure 3:
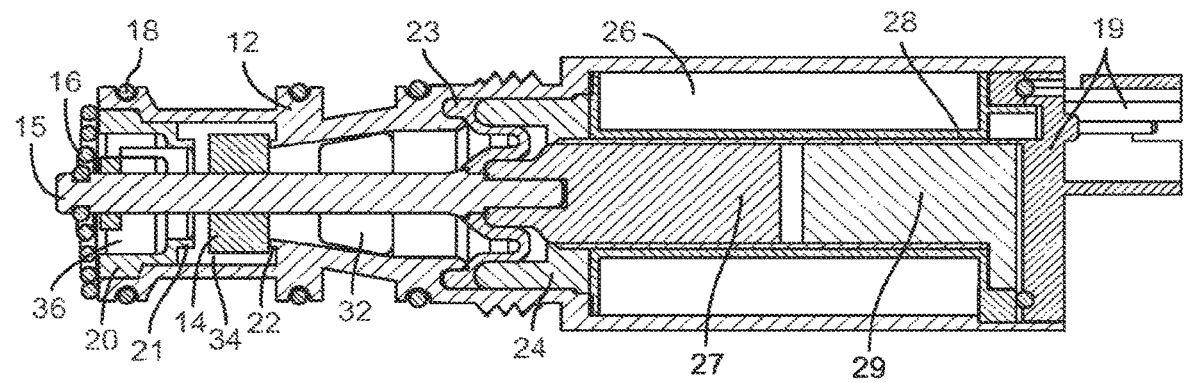
FIG. 3 is a cross-section view of the high flow valve illustrated in FIG. 1 with the valve in an energized state.
Figure 5:
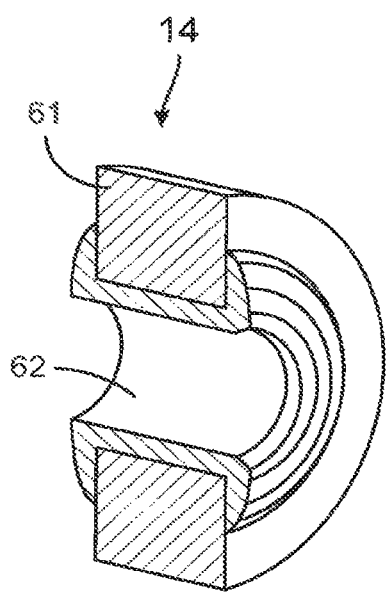
FIG. 5 is a cross-section fragmentary view of the valve seal of the high flow valve of FIG. 1
Figure 6:
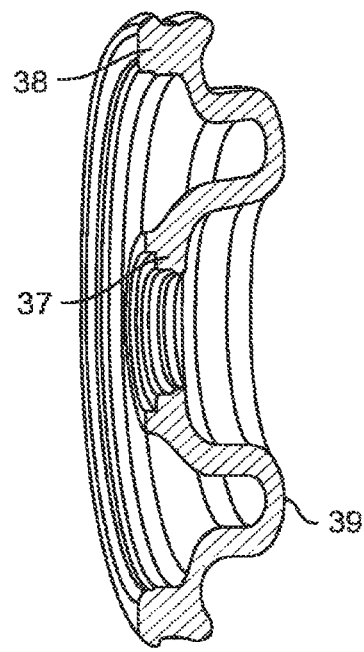
FIG. 6 is a cross-section fragmentary view of the diaphragm of the high flow valve of FIG. 1.
Figure 7:
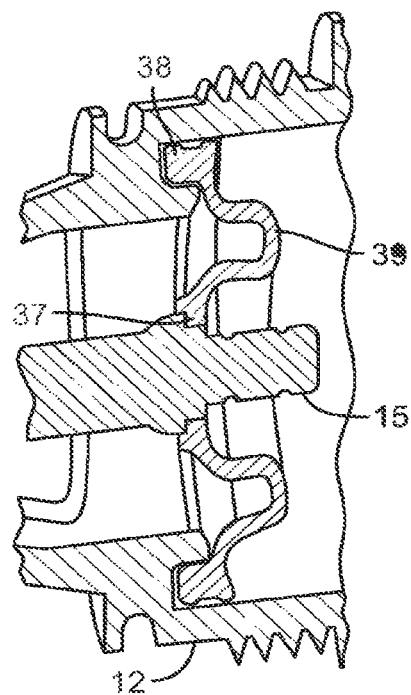
FIG. 7 is a cross-section fragmentary view of the diaphragm illustrated in FIG. 5 showing a portion of the valve of FIG. 1.

As discussed below, the valve seal 14 is configured to be moved by the seal rod 15 between an exhaust seal seat 21 (e.g., when the solenoid is de-energized) and a supply seal seat 22 (e.g., when the solenoid is energized). The valve seal 14 is formed of a suitable sealing material, such as rubber, so that when the valve seal 14 is seated against the exhaust seal seat 21, as depicted in FIG. 2, the delivery port A 34 is open and the exhaust port R 36 is sealed closed. When the valve seal 14 is seated against the supply seal seat 22, as depicted in FIG. 3, the delivery port A 34 is sealed closed and the exhaust port R 36 is open In addition, the high flow valve 10 includes a diaphragm 23. As shown in FIGS. 6 and 7 the diaphragm 23 may include an inner band 37 that is attached to the outer circumference of the seal rod 15 and an outer band 38 which is attached to the inner circumferential wall of the body 12. The diaphragm 23 includes an arched portion 39 between the inner band 37 and outer band 38. The arched potion 38 allows the diaphragm 23 to balance forces acting on the port 32 without generating a biasing force on the seal rod 15. The inner band 37 and the outer band 38 may be attached to the seal rod 15 and body 12, respectively, in any suitable manner. In the embodiment of FIGS. 5 and 6, the inner band 37 and outer band 38 include beads which enable the bands 37, 38 to be retained in grooves in the seal rod and body 12, respectively.

In certain embodiments, tension in the inner and outer bands of the diaphragm 23 may apply radial force onto the seal rod 15 and the body 12 to compress the inner and outer beads and contain pressurized fluid. Such tension removes the need for additional parts to compress the diaphragm 23 to contain pressurized fluid and reduces the costs of the high flow valve 10. Returning to FIG. 2, the high flow valve may also include an inner field plate 24 to clamp the diaphragm 23 to the body 12.

The body 12, seal rod 15, exhaust cap 20 and inner field plate 24 of the high flow valve 10 may be made from any of a variety of materials, such as polymers, ferritic stainless steel and brass, for example. The return spring 16 may be made from any of a variety of materials, such as stainless steel, for example. The valve seal 14, O-ring 18 and diaphragm 23 may be made from any of a variety of materials, such as rubber, for example. The connector cap 19 and solenoid bobbin may be made from any of a variety of materials, such as polymers, for example. The solenoid coil 26 may be made from any of a variety of materials, such as copper, for example. The armature 27 and pole piece 29 may be made from any of a variety of materials, such as steel, for example. The armature guide tube 28 may be made from any of a variety of materials, such as stainless steel or brass for example.

Turning to FIGS. 1-4, in multiple embodiments, the high flow valve 10 is assembled in a series of steps. First, the diaphragm 23 is pressed onto the seal rod 15. Next, the armature 27 is pressed onto the seal rod 15. The seal rod 15, diaphragm 23 and armature 27 are then placed through the solenoid end of the body 12. The diaphragm 23 is then pressed into the body 12. Next, the inner field plate 24 is pressed into the body 12. The solenoid coil 26 and bobbin are then placed in the body 12. The armature guide tube 28 is then placed in the body 12 around the armature 27. The pole piece 29 is then placed in the body 12. Next, the valve seal 14 is pressed onto the seal rod 15. The exhaust cap 20 is then pressed into the body 12, the return spring 16 is placed onto the seal rod 15, the connector cap 19 is pressed into the body 12, and the O-ring 18 is placed onto the valve body 12.

Figure 4:
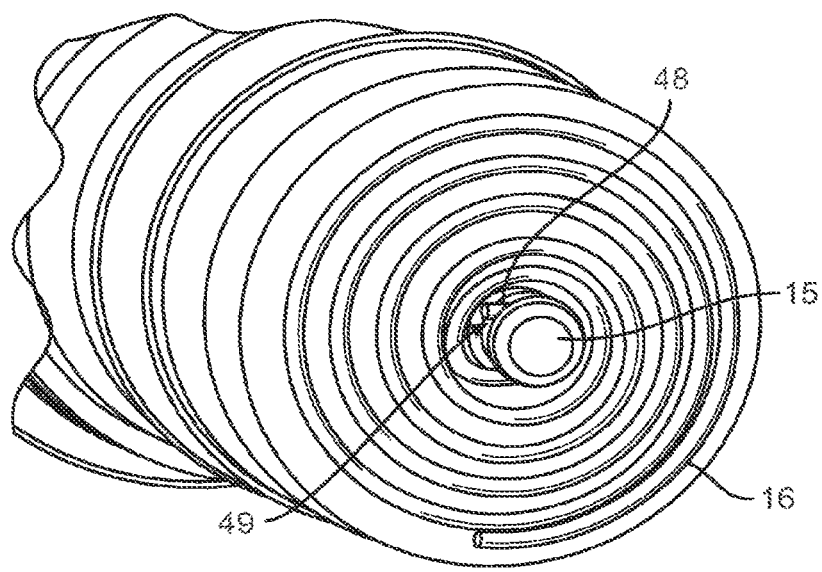
FIG. 4 is an end view of the high flow valve of FIG. 1 showing the return spring.

FIG. 4 depicts the return spring 16 in greater detail. As can be seen in FIG. 4, the return spring 16 comprises a coil spring with a short conical shape. The inner most winding of the spring is attached to the end of the seal rod 15. To attach the inner spring end to the seal rod 15, the inner spring end includes a bent spring arm 48 which is received in a spring groove 49 provided in the seal rod 15. The spring arm 48 can be pried open and snapped onto the spring groove 47 which enables the spring load to be coupled to the seal rod 15 without the need for additional parts, such as a snap ring.

The valve seal 14 may be pressed onto the seal rod 15 while the armature 27 is positioned against the pole piece 29. In some embodiments, the valve seal 14 may be over-pressed against the supply seal seat 22 while the armature 27 is positioned against the pole piece 29. In certain embodiments, the valve seal 14 may be over-pressed against the supply seal seat 22 with a predetermined force or press distance, such as 0.005 in., for example. Over-pressing the valve seal 14 against the supply seal seat 22 assists in sealing the valve seal 14 at the supply seal seat 22 when the valve seal 14 moves to the supply seal seat 22.

FIG. 5 depicts an embodiment of the valve seal 14 in greater detail. As can be seen in FIG. 5, the valve seal 14 includes a seal body 61 and a carrier or spool 62. The seal body 61 is formed of a flexible material, such as rubber. The seal body 61 is carried on a spool 62, which is mounted (e.g., pressed) onto seal rod 15. The spool is formed of a sturdy, rigid material, such as brass. The spool includes a spool hub on which the seal body rests and sidewalls which extend outwardly from the hub. As can be seen in FIG. 5, the sidewalls of the spool extend to only a part of the way with respect to the sides of the seal body 61 which leaves the outer portion of the seal body 61 unsupported by the spool. The sidewalls of the spool add a degree of stiffness to the inner portion of the seal body 61 while leaving the outer portion of the seal body free to flex. The flexible nature of the outer portion of the valve seal 14 allows the valve seal 14 to deflect when it initially contacts a valve seat. This deflection allows for additional movement of the armature/shaft assembly once the valve seal has contacted the supply seal seat. The flexible nature of the valve seal along with the over pressing of the valve seal causes the armature to decelerate prior to contacting the pole piece. This deceleration significantly reduces the mechanical shifting noise, which is objectionable.

During operation, the electrical power source provides AC or DC power to the solenoid coil 26 and bobbin. The solenoid coil 26 and bobbin receive power and induce a magnetic field in the pole piece 29 and armature 27. The pole piece 29 then attracts the armature 27 to move the valve seal 14 between the exhaust cap seal seat 21 and the supply seal seat 22.

As shown in FIG. 2, when the solenoid coil 26 is de-energized or "off", the return spring 16 pulls the seal rod 15 to hold the valve seal 14 against the exhaust seal seat 21, blocking fluid from exiting the exhaust port 36 and allowing fluid to flow from the supply port 32 to the delivery port 34. As shown in FIG. 3, when the solenoid coil 26 is energized or "on", the solenoid coil 26 magnetically pulls the armature 27 and compresses the return spring 16 to hold the valve seal 14 against the supply seal seat 22, blocking fluid from the supply port 32 and allowing fluid to flow from the delivery port 34 to the exhaust port 36.

In a normally open valve configuration, when the valve seal 14 is positioned on the exhaust seal seat 21, the valve seal 14 exerts an exhaust seal pressure force over an exhaust seal pressure area. The diaphragm 23 exerts a diaphragm force over a diaphragm pressure area and opposite the exhaust seal pressure force. In certain embodiments, the exhaust seal seat 21 has a diameter that makes the exhaust seal pressure area about equal to the diaphragm pressure area and allows the exhaust seal pressure force and the diaphragm force to balance. Such a balancing of the exhaust seal pressure force and the diaphragm force reduces the forces acting on the armature 27 and facilitates the initial movement of the armature 27 toward the pole piece 29 when the solenoid coil 26 is energized. Thus, a smaller, lower power solenoid coil 26 can be used to initiate movement of the armature 27. Also, with the reduction of the forces acting on the armature 27 and reduction in the magnetic force needed to initiate movement of the armature 27, the gap between the armature 27 and the pole piece 29 can be increased to provide greater valve stroke. Greater valve stroke allows a larger flow rate of fluid through the valve.

In other embodiments, in a normally closed valve configuration, when the solenoid coil is de-energized or "off, the return spring holds the valve seal against the supply seal seat, blocking fluid from the supply port and allowing fluid to flow from the delivery port to the exhaust port. In such embodiments, when the solenoid coil is energized or "on", the solenoid coil magnetically pulls the armature and compresses the return spring, blocking fluid from exiting the exhaust port and allowing fluid to flow from the supply port to the delivery port.

The armature and pole piece air gap must be set so the initial solenoid attraction force on the armature is sufficient to initiate a shift of the valve. If the initial air gap is too great, then the valve may not shift. If the air gap is too small, then the rubber seal mat not contact the supply seat when the valve shifts. The set the armature-to-pole piece air gap, the end of the seal rod 15 is pressed toward the solenoid until the armature 27 contacts the pole piece 29. The valve seal 14 on the seal rod is then pressed against the supply seat 22 with a calibrated amount of force to deflect the rubber seal (e.g., over-pressing). After the pressure is removed, the valve seal 14 relaxes which pulls the armature 27 away from the pole piece 29 to from a small air gap between the pole piece 29 and the armature 27.

By over-pressing the rubber valve seal 14 against the supply seat 22 using a predetermined force or press distance, the rubber seal is guaranteed to properly seal at the supply seat 22 when the valve shifts and also form a small air gap at the end of valve stroke. This press technique setting the initial air gap eliminates the need of an expensive, adjustable pole piece which is often required in previously known high flow valves to set a gap so that the initial solenoid coil magnetic force can initiate a shift in valve position.

The solenoid coil induces a magnetic field in the ferrous pole piece, outer shell, and armature. The armature is attracted by the pole piece. The attraction force is greatly reduced when the air gap between the pole piece and armature is large. As the armature starts to move toward the pole piece, the air gap decreases and the magnet attraction force dramatically increases. Therefore, by minimizing the "other" forces acting on the armature will better permit the armature to initiate its movement when the magnetic attraction force is at its weakest.

One of the primary forces acting against the armature 27 is the pressure force acting on the valve seal 14 toward the exhaust seal seat 21. To reduce the force required of the solenoid to move the armature 27 against the force exerted on the valve seal 14, the diaphragm is configured to exert a balancing force in the opposite direction.

The diaphragm is of low spring rate as to transmit negligible forces to the armature in both the energized and de-energized states. The exhaust seat diameter may be adjusted to achieve optimum pressure force balance between the exhaust seal and the diaphragm by establishing equal pressure areas. Without the rubber diaphragm and its pressure force balancing, a much larger and more expensive solenoid would be needed to shift the valve.

Figure 8:
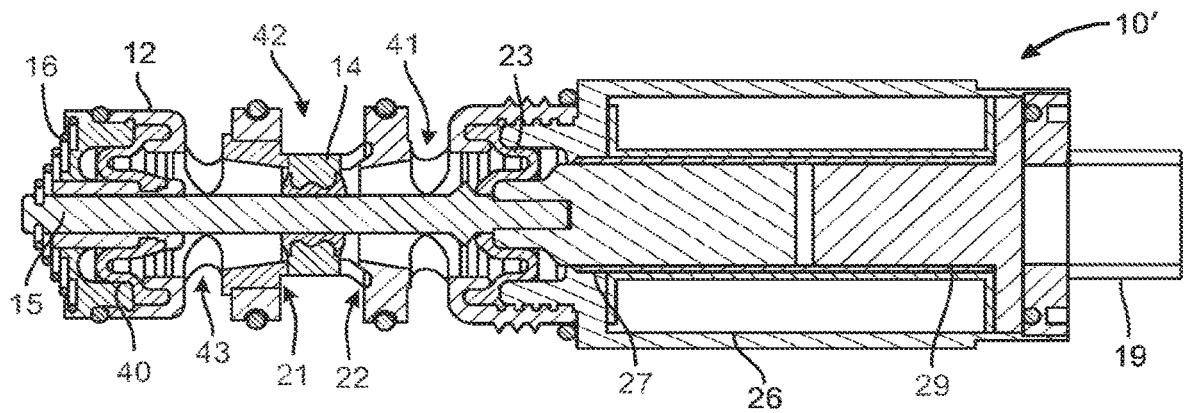
FIG. 8 is a cross-sectional view of a high flow 3/2 normally closed valve.
Figure 9:
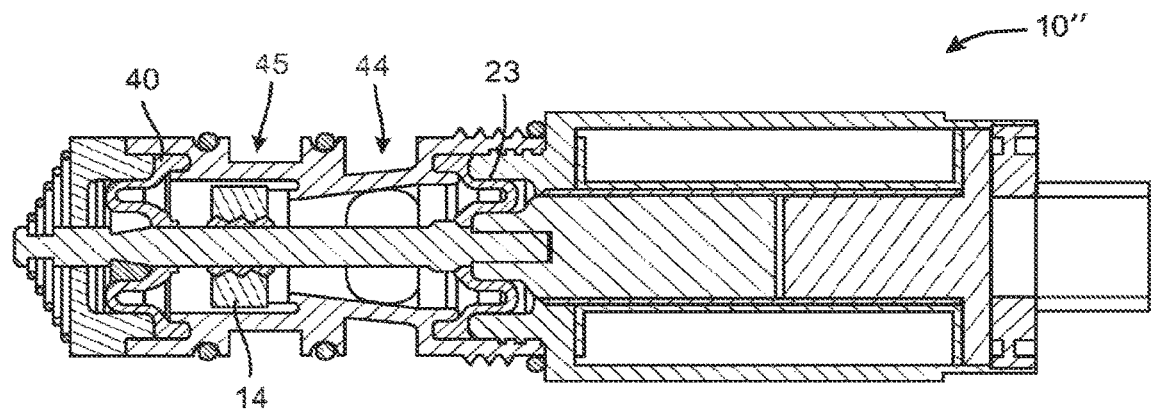
FIG. 9 is cross-sectional view of a high flow 2/2 normally open valve.
Figure 10:
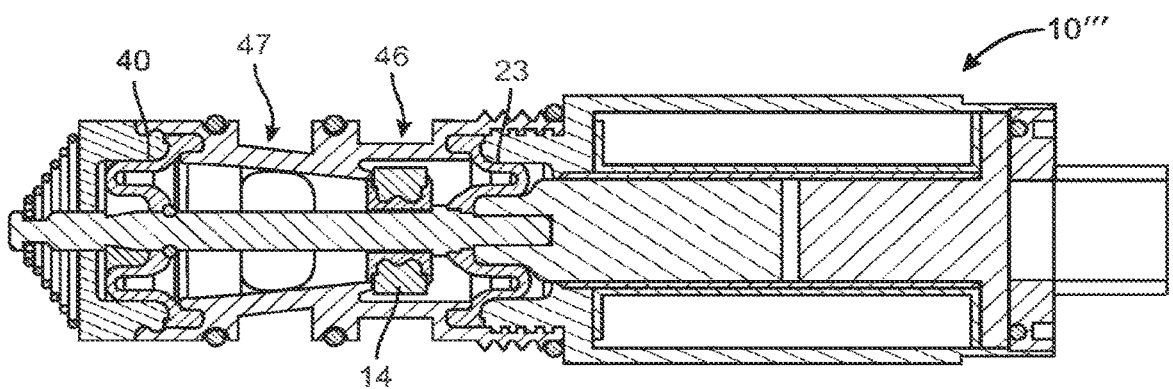
FIG. 10 is cross-sectional view of a high flow 2/2 normally closed valve.

The high flow valve 10 depicted and described with reference to FIGS. 1-3 is a high flow 3/2 normally open (NO) valve. FIGS. 8-10 depict diaphragms incorporated into other types of valves. In particular, FIG. 8 depicts a high flow valve 10' in the form of 3/2 (three port, two spool position) normally closed (NC) valves. FIG. 9 depicts a high flow valve 10" comprising a high flow 2/2 (two port, two spool position) normally open valve. FIG. 10 depicts a high flow valve 10''' comprising a high flow 2/2 (two port, two spool position) normally closed valve. The valve 10' of FIG. 7 includes three ports 41, 42, 43. The valve 10" of FIG. 9 includes two ports 44, 45, and the valve 10''' of FIG. 10 includes two ports 46, 47.

The high flow valves of FIGS. 8-10 each include a first diaphragm 23 which corresponds to the diaphragm 23 of the embodiment of FIG. 13. In addition, the high flow valves of FIGS. 8-10 each include a second diaphragm 40 which is located on an opposite end of the seal rod 15 from the first diaphragm 23. The use of two diaphragms arranged in this manner enables further balancing of the "other" forces acting with or against the movement of the armature and seal rod. The second diaphragm 40 has a configuration similar to the configuration of the first diaphragm. In particular, the second diaphragm may include an inner band that is attached to the outer circumference of the seal rod 15 near the outer end of the seal rod. The second diaphragm includes an outer band which is attached to the inner circumferential wall of the body 12. The second diaphragm 40 also includes an arch-shaped portion. The second diaphragm 40 is arranged in the valve with the arch-shaped portion facing outwardly and opposite to arch-shaped portion of the first diaphragm.

In the embodiment of FIG. 8, the first diaphragm 23 is configured to generate a balancing force that is equal to and opposite from any non-solenoid forces acting on the valve seal 14 in the direction toward the exhaust seal seat 21. The second diaphragm 40 is configured to generate a balancing force that is equal to and opposite from any non-solenoid forces acting on the valve seal in the direction toward the supply seal seat 22. The use of the dual diaphragm construction provides balanced forces on the armature/shaft assembly with pressure or vacuum applied to any port, such as the three ports 41, 42, 43 of the high flow 3/2 NC valve of FIG. 8, the two ports 44, 45 of the high flow 2/2 NO valve of FIG. 9, and the two ports 46, 47 of the high flow 2/2 NC valve of FIG. 10. This in contrast to the valve 10 shown in FIGS. 1-3 which is only balanced which pressure is applied to port 32.

As described above, the configuration of the high flow valve 10 is small, lightweight and uses less power relative to previously known high flow valves. The high flow valve 10 provides an efficient and cost-effective method to provide a high flow rate of fluid.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:
1. A high flow valve, comprising:
  a body;
  seal seat;
  a solenoid including an armature;
  a seal rod positioned within the body and connected to the armature, the seal rod being configured to be moved between a first position and a second position by the armature;
  a return spring attached to an end of the seal rod opposite the armature;
  a valve seal on the seal rod in a position such that:
    the valve seal is spaced apart from the seal seat when the seal rod is in the first position and the valve seal is positioned in sealing contact with the seal seat when the seal rod is in the second position;

a first port positioned on the body between the seal seat and the return spring;

a first diaphragm that extends between the body and the seal rod at a first position, the first diaphragm being configured to generate a first balancing force in a direction opposite to a first pressure force exerted on the valve seal toward the seal seat; and a second diaphragm that extends between the body and the seal rod at a second position, the second diaphragm being configured to generate a second balancing force in a direction opposite to a second pressure force exerted on the valve seal toward the seal seat, each of the first and second diaphragms including an inner band and an outer band, the inner and outer bands of the first and second diaphragms having a circumferential bead that is retained in a corresponding groove of the seal rod and the body, respectively, so that the first and second diaphragms are directly secured to the seal rod solely by providing tension in the inner and outer bands to apply a radial force onto the seal rod and urge the circumferential bead radially into the corresponding groove.

2. The high flow valve of claim 1, wherein the first balancing force is equal to the first pressure force, and the second balancing force is equal to the second pressure force.

3. The high flow valve of claim 1, wherein the first diaphragm is positioned at a first end of the seal rod and the second diaphragm is positioned at a second end of the seal rod that is opposite the first end.

4. The high flow valve of claim 1, wherein each of the first and second diaphragms includes:

the outer band attached to an inner circumferential surface of the body; and an arch-shaped portion between the inner band and the outer band.

5. The high flow valve of claim 4, wherein the arch-shaped portion of the first diaphragm extends away from the seal seat.

6. The high flow valve of claim 4, wherein the arch-shaped portion of the first diaphragm extends in a direction opposite the arch-shaped portion of the second diaphragm.

7. The high flow valve of claim 1, wherein is the first diaphragm is arranged between the armature and the seal rod.

8. The high flow valve of claim 1, further comprising:

wherein the return spring is configured to bias the valve seal toward the first position, the first position configured as a normally-open position.

9. The high flow valve of claim 8, wherein the return spring is a conical-shaped spring with an inner-most winding of the return spring attached to the end of the seal rod.

10. The high flow valve of claim 9, wherein the return spring includes a spring arm that is snapped into a spring groove provided in the end of the seal rod.

11. The high flow valve of claim 1, wherein the first diaphragm and the second diaphragm are configured to provide balancing forces on the armature and seal rod when a pressure or vacuum is applied to a port in the body.

12. The high flow valve of claim 1, wherein the seal rod includes an annular shoulder, and wherein one or more of the first and second diaphragms includes an annular shoulder at the inner band that engages the annular shoulder of the seal rod.

13. The high flow valve of claim 1, wherein the circumferential bead of the outer band includes a protrusion extending in an axial direction, the protrusion extending opposite an arch-shaped portion between the inner band and the outer band.

14. A high flow valve, comprising:

a body;

a seal seat;

a solenoid including an armature;

a seal rod positioned within the body and connected to the armature, the seal rod being configured to be moved between an open position and a closed position by the armature;

a return spring attached to an end of the seal rod opposite the armature;

a valve seal on the seal rod and arranged to come into sealing contact with the seal seat;

a first port positioned on the body between the seal seat and the return spring; and a diaphragm arrangement that extends between the body and the seal rod, the diaphragm arrangement being configured to generate a balancing force in a direction opposite to a pressure force exerted on the valve seal, the diaphragm arrangement including an inner band and an outer band, the outer band having a circumferential bead that is retained in a corresponding groove of the body so that the diaphragm arrangement is directly attached to the body, and the inner band having a circumferential bead that is retained in a corresponding groove of the seal rod to secure the diaphragm arrangement to the seal rod solely by providing tension in the inner and outer bands to apply a radial force onto the seal rod via engagement of the circumferential bead with the corresponding groove of the seal rod.

15. The high flow valve of claim 14, wherein the diaphragm arrangement is arranged on the seal rod between the return spring and the armature.

16. The high flow valve of claim 14, wherein the diaphragm arrangement includes a first diaphragm with the inner band attached circumferentially to the seal rod, the outer band attached to an inner circumferential surface of the body, and an arch-shaped portion between the inner band and outer band, and wherein the arch-shaped portion extends away from the seal seat.

17. The high flow valve of claim 16, wherein the diaphragm arrangement includes the first diaphragm and a second diaphragm with the inner band attached circumferentially to the seal rod, the outer band attached to an inner circumferential surface of the body, and an arch-shaped portion between the inner band and outer band.

18. The high flow valve of claim 14, wherein the seal rod is a singular body on which the valve seal is fixedly positioned, the seal rod extending directly between the return spring and the armature, and wherein the circumferential bead of the inner band is retained in the corresponding groove of the seal rod, formed in the singular body of the seal rod, so that the diaphragm arrangement is directly attached to the seal rod.

19. The high flow valve of claim 14, wherein the tension provided in the inner and outer bands via the engagements of the circumferential beads in the respective grooves secures the circumferential beads in the respective grooves without axial compression of the circumferential beads by one or more other components of the diaphragm arrangement.

20. The high flow valve of claim 14, wherein the diaphragm arrangement is not clamped at the seal rod with a washer.

21. The high flow valve of claim 14, wherein the circumferential beads of the inner band and the outer bands are radially compressed so that the diaphragm provides a barrier against pressurized fluid.

22. A method of assembling a high flow valve, the high flow valve including a body, a solenoid having an armature and a pole piece, a seal rod extending from the armature, a return spring attached to an end of the seal rod opposite the armature, a seal seat adjacent to the seal rod, and a first port positioned on the body between the seal seat and the return spring, the method comprising:

pressing a first diaphragm onto the seal rod, the first diaphragm generating a balancing force in a direction opposite to a pressure force exerted on a valve seal of the seal rod, the first diaphragm including an inner band and an outer band, the outer band having a circumferential bead that is retained in a corresponding groove of the body so that the first diaphragm is directly attached to the body, and the inner band having a circumferential bead that is retained in a corresponding groove of the seal rod to secure the first diaphragm to the seal rod solely by providing tension in the inner and outer bands to apply a radial force onto the seal rod via engagement of the circumferential bead with the corresponding groove of the seal rod;

pressing the first diaphragm into the body to extend between the body and the seal rod;

pressing the valve seal onto the seal rod until the valve seal contacts the seal seat;

after the valve seal contacts the seal seat, continuing to press the valve seal toward the seal seat such that the valve seal deflects;

securing the valve seal on the seal rod at a position at which the valve seal is deflected a predetermined amount; and allowing the valve seal to relax after being secured on the seal rod such that the seal rod is pulled away from the pole piece to set an air gap for the solenoid.

\* \* \* \* \*